United States Patent [19]

Hunter et al.

[11] Patent Number: 5,260,563
[45] Date of Patent: Nov. 9, 1993

[54] COMPACT LASER WARNING RECEIVER

[75] Inventors: Reginald W. Hunter; Gerald D. Powell; Ronald E. Ham; Joseph Lenhardt; Thomas G. Ratliff, all of Austin, Tex.

[73] Assignee: Tracor, Inc., Austin, Tex.

[21] Appl. No.: 973,222

[22] Filed: Nov. 9, 1992

Related U.S. Application Data

[63] Continuation of Ser. No. 838,944, Feb. 13, 1992, abandoned.

[51] Int. Cl.$^5$ .............................................. H01J 40/14
[52] U.S. Cl. ............................... 250/214; 250/214 A; 307/311
[58] Field of Search ....... 250/214 A, 214 AG, 214 B, 250/214 AL, 214 L; 307/311, 493, 491

[56] References Cited

U.S. PATENT DOCUMENTS

| | | |
|---|---|---|
| 3,867,628 | 2/1975 | Brown . |
| 4,015,149 | 3/1977 | Tsunekawa et al. ................ 307/311 |
| 4,102,059 | 7/1978 | Kimble et al. . |
| 4,236,069 | 11/1980 | Laughlin . |
| 4,259,570 | 3/1981 | Leonard .......................... 250/214 A |
| 4,276,472 | 6/1981 | Constantino . |
| 4,366,378 | 12/1982 | Simons . |
| 4,713,534 | 12/1987 | Masters et al. ................... 250/214 B |
| 4,724,312 | 2/1988 | Snaper . |
| 4,748,318 | 5/1988 | Bearden et al. . |
| 4,778,990 | 10/1988 | Laughlin . |
| 4,851,689 | 7/1989 | Hasegawa ....................... 250/214 B |

Primary Examiner—David C. Nelms
Assistant Examiner—K. Shami
Attorney, Agent, or Firm—Arnold, White & Durkee

[57] ABSTRACT

A portable laser pulse detection device. Optical pulses are sensed by a photodiode, and if the pulse width is narrow enough to yield sufficient spectral energy within the bandpass of the tuned circuits, a "laser occurred" indication will be produced by the processing circuitry. Automatic adjustment of the detected output for non-laser incident radiation is made by varying the signal level into a sequential detection logarithmic amplifier by a voltage proportional to the integral of the incident radiation over a short period of time. The device is shielded against electromagnetic interference and adapts automatically to variations in background noise.

24 Claims, 3 Drawing Sheets

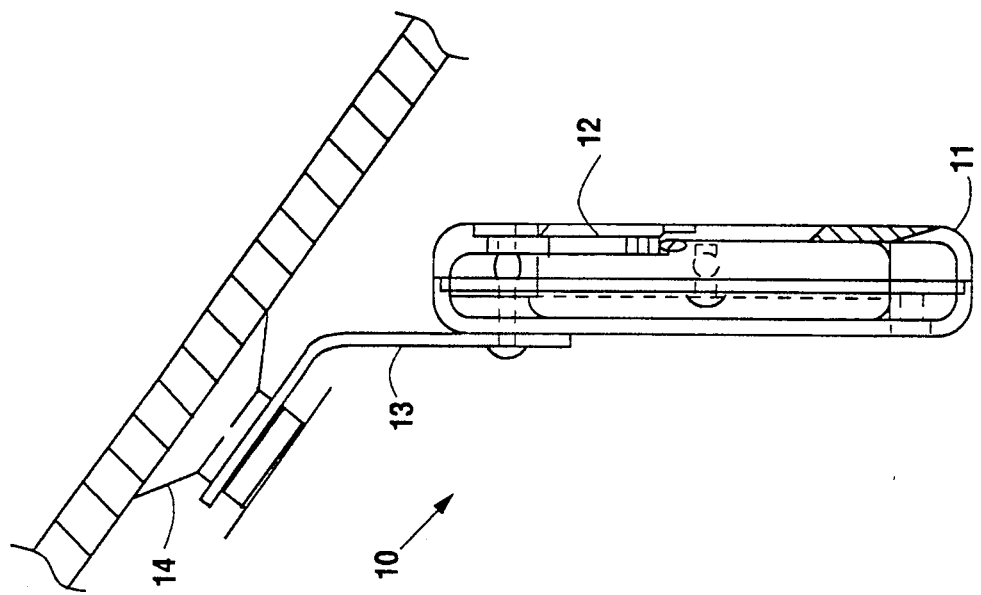
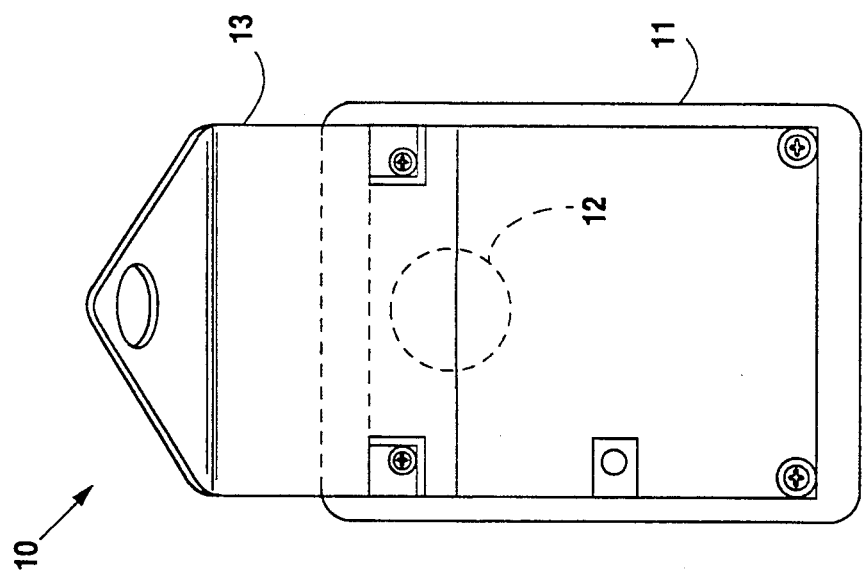

COMPACT LASER WARNING RECEIVER

This application is a continuation of application Ser. No. 07/838,944, filed Feb. 13, 1992 now abandoned.

FIELD OF THE INVENTION

This invention relates generally to an apparatus for detecting incident radiant energy, and more particularly relates to a portable apparatus for detecting the presence of pulsed-laser energy in various environments.

BACKGROUND OF THE INVENTION

A laser is a device that converts input power into a very narrow, intense beam of coherent energy at a single frequency, generally, but not necessarily within the visible to infrared region of the electromagnetic spectrum. Lasers may operate either continuously or in a pulsed mode. High power lasers generally operate in a pulsed mode due to input power requirements, cooling problems, and other considerations. The pulse width of the output of a pulsed laser is typically on the order of nanoseconds or picoseconds. Lasers are well known in today's technological environment and are useful in numerous and diverse applications.

The ability to detect laser energy is desirable in various environments. Most known laser detection systems are non-portable, expensive, complex, and require accurate or predetermined alignment or positioning within the path of a laser beam in order to function properly. These systems are therefore impractical for use by personnel on airborne and ground-based platforms or in the field.

It is therefore desirable to provide an apparatus that is completely self-contained in a compact, light-weight, and portable configuration for detecting pulsed-laser energy in various environments.

SUMMARY OF THE INVENTION

According to the present invention, the disadvantages of the prior art are minimized by providing a sensitive, low-cost, portable apparatus for detecting pulsed laser energy, which is designed to accompany personnel on airborne or ground based platforms and in the field. The portable laser warning receiver in accordance with the disclosed embodiment of the invention generates an alarm signal that can be used to produce visual and audible warnings upon the detection of laser energy having certain characteristics or can automatically inform a system microprocessor that there has been an occurrence of laser irradiation.

All incident radiation passed by filters, diffuse transmissive plates and fiberoptic elements (if used) into a laser detector contributes to the output of the detection. The average level of input power is proportional to the voltage occurring across a parallel capacitor/resistor circuit through which all of the detector current is passed. The high frequency components of the voltage appearing across a parallel combination of the diode and a resonant circuit represent the energy contained in a specific frequency segment of the incident laser pulse.

The exponentially decaying sinusoidal waveform from the resonant circuit is applied to the input of a sequentially detecting logarithmic video amplifier. The voltage across the parallel capacitor/resistor circuit is converted into a voltage and applied to the current source in the logarithmic amplifier to automatically offset the output. The output of the logarithmic amplifier is then a triangular pulse whose amplitude is proportional to the power in the pulse relative to the ambient incident low frequency background irradiation.

Because of its high sensitivity, the sensor module is shielded against the effects of electromagnetic interference (EMI).

BRIEF DESCRIPTION OF THE DRAWINGS

The foregoing and other aspects of the present invention will be best appreciated with reference to the detailed description of a specific embodiment of the invention, which follows, when read in conjunction with the accompanying drawings, wherein:

FIGS. 1a and 1b are front and side views, respectively, of a compact laser warning receiver in accordance with one embodiment of the present invention;

DETAILED DESCRIPTION OF A SPECIFIC EMBODIMENT OF THE INVENTION

Figure 2:
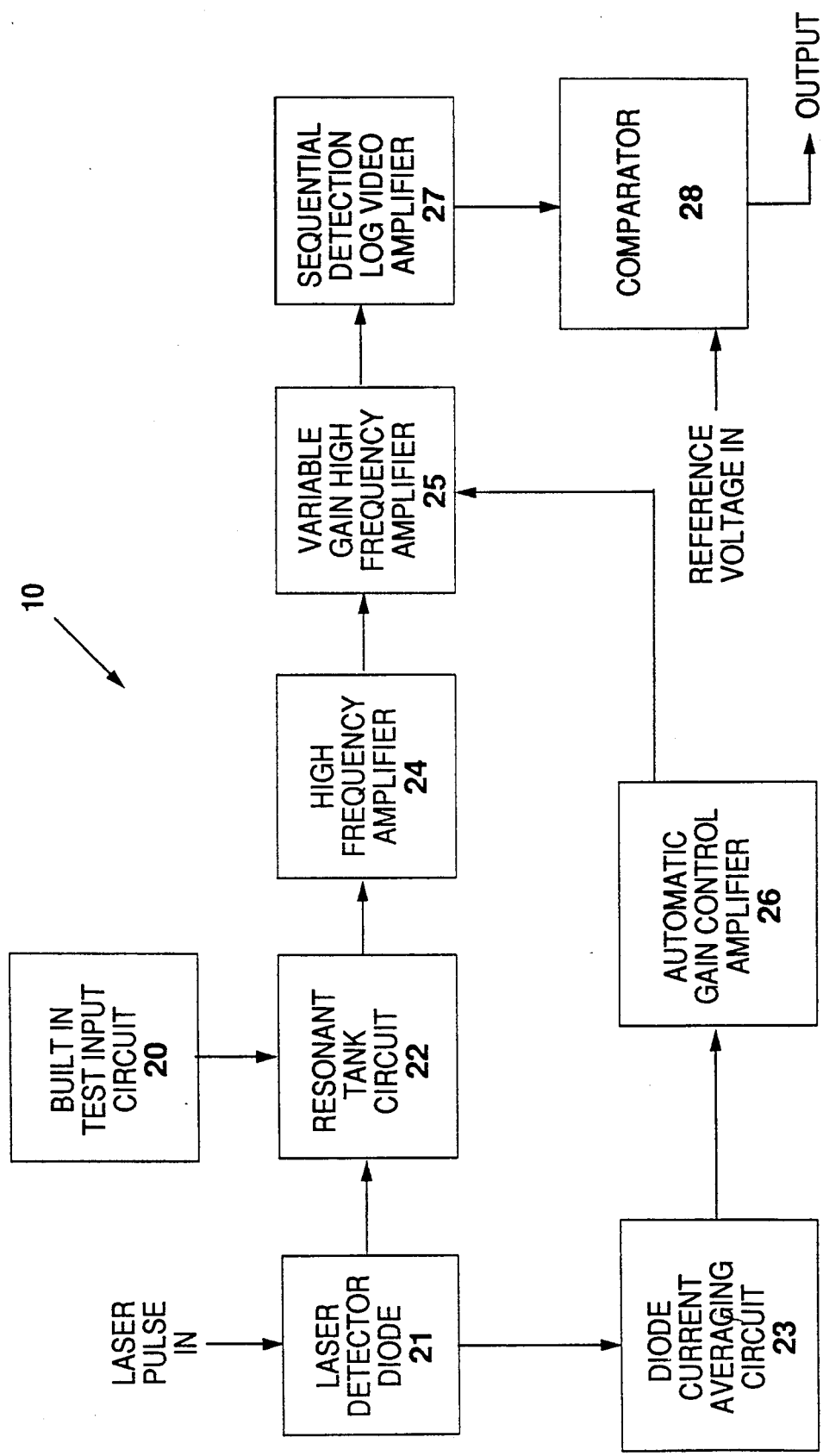
FIG. 2 is a block diagram showing the interconnection of internal functional components in the compact laser warning receiver of FIG. 1.

Referring to FIGS. 1a and 1b, perspective views of the external features of a laser warning receiver 10 in accordance with one embodiment of the present invention are shown. A case 11 contains an optical opening 12 that is backed by an optical detector to be hereinafter described in greater detail with reference to later Figures. Case 11 in the presently disclosed embodiment is supplied with a mounting bracket 13 having a suction cup 14 attached thereto, for allowing laser warning receiver 10 to be mounted on a protrusion, window, or other surface. It is to be understood, of course, that some other type of attachment mechanism, such as a spring-clip or the like, may be substituted in place of suction cup 14. Case 11 functions to shield internal components of laser warning receiver 10 from EMI effects by an interior and/or exterior plating of a thin conductive metal coating. According to the presently disclosed embodiment of the invention, laser warning receiver 10 measures approximately two-inches by three-inches by one-half-inch, and weights approximately six ounces.

Referring now to FIG. 2, a block diagram of the internal components of the presently disclosed embodiment of the invention is shown. Optical energy is received by a laser detector 21 by way of diffuse optics, a lens, an array of lenses, a fiberoptic element, or a combination of these optical components (not represented in FIG. 2). Laser detector 21 preferably includes a laser detecting diode 21 which is shunted by a resonant tank circuit 22 that resonates with the diode capacitance at a frequency determined by the characteristics of received laser pulses. A diode current averaging circuit 23, composed of a parallel capacitor and resistor combination, produces a voltage that is proportional to the low frequency energy detected by detector diode 21 plus the detector diode's "dark current" (i.e., the quiescent current produced by diode 21 in the absence of detected irradiation). A capacitor in diode current averaging circuit 23 bypasses all high-frequency currents to ground, enabling resonant tank circuit 22 and laser detector 21 to produce an exponentially decaying sinusoidal waveform when laser detector 21 is irradiated with a laser pulse.

The decaying sinusoidal waveform produced resonant tank circuit 22 is injected into a high frequency amplifier 24 having a very high input impedance. As would be appreciated by one of ordinary skill in the art of circuit design, the high input impedance of amplifier 24 prevents resonant tank circuit 22 from being excessively loaded, which would cause excessive decay of the sinusoidal waveform. The output of high frequency amplifier 24 is connected to the input of a variable gain amplifier 25. The gain of variable gain high frequency amplifier 25 is controlled by the output of an automatic gain control (AGC) amplifier 26. The gain from variable gain amplifier 25 decreases with a decreasing voltage from AGC amplifier 26.

The output from diode current averaging circuit 23 is applied to the input of AGC amplifier 26. AGC amplifier 26 is comprised of an inverting direct current (DC) voltage amplifier with a fixed voltage offset to match the gain control requirements of variable gain high frequency amplifier 25. With no ambient or background noise, voltage from diode current averaging circuit 23 will be low. This results in the output from AGC amplifier 26 being at its maximum. This, in turn, maximizes the voltage applied to the variable gain amplifier 25 and results in maximum gain and system sensitivity. An increased output voltage from diode current averaging circuit 23 decreases the voltage output of AGC amplifier 26 and correspondingly reduces the gain of variable gain high frequency amplifier 25. This reduces the system gain and sensitivity, thereby preventing low frequency noise and interference from producing a false alarm output.

The output from variable gain high frequency amplifier 25 is routed to the input of a sequential detection logarithmic video amplifier 27. Sequential detection logarithmic video amplifier 27 produces an output that is proportional to the logarithm of its input. This is basically a controlled saturation and greatly increases the instantaneous dynamic range of the system when compared to conventional linear systems.

The output from sequential detection logarithmic video amplifier 27 is applied to the input of a comparator with hysteresis 28. The threshold level of comparator with hysteresis 28 is set to alarm when the output of sequential detection logarithmic video amplifier 27 exceeds a level that assures maximum sensitivity with minimum false alarms. The output of comparator with hysteresis 28 is used to trigger an external alarm circuit or to signal a microprocessor that a laser pulse has been detected.

Figure 3:
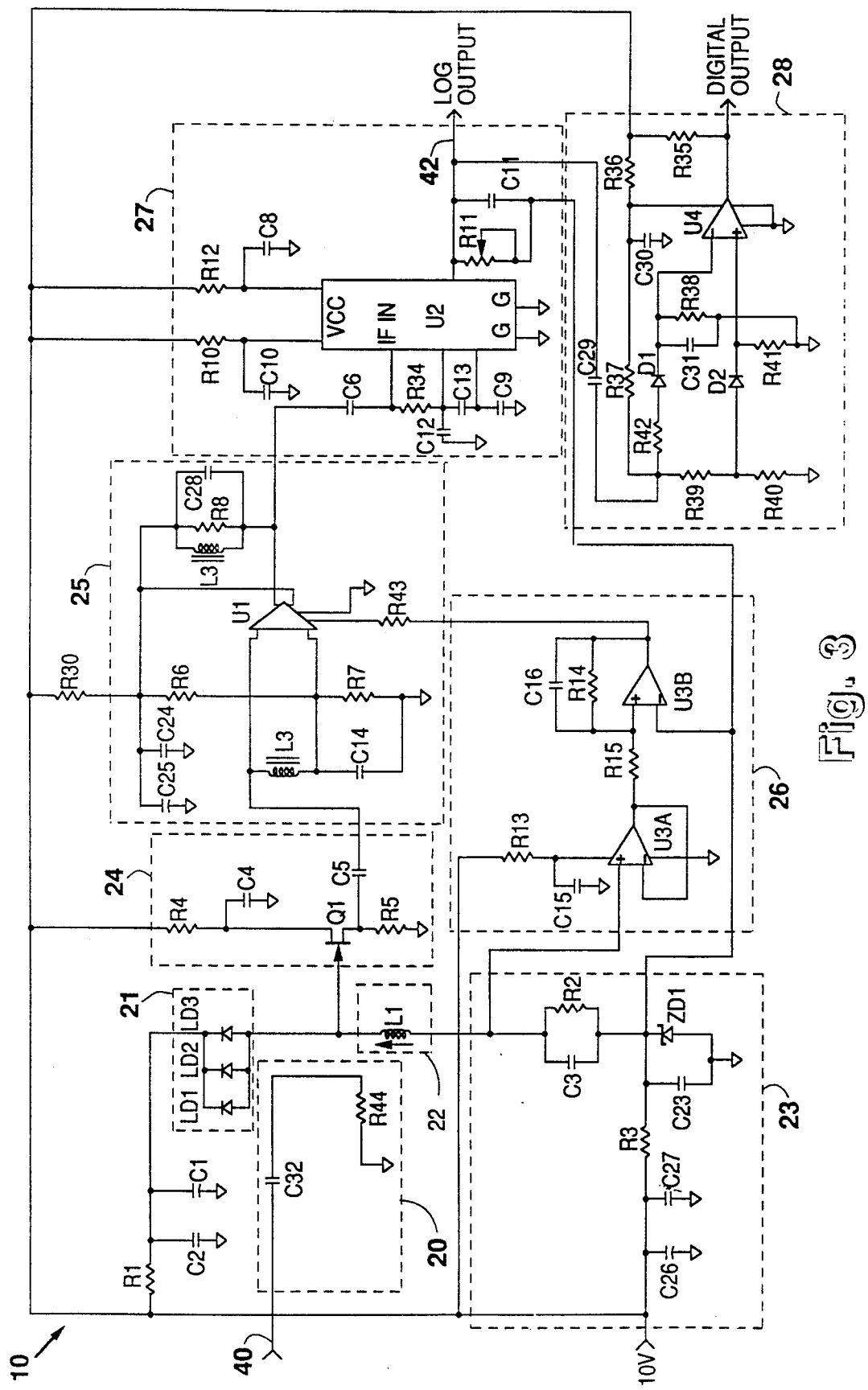
FIG. 3 is a schematic diagram of the internal functional components in the compact laser warning receiver of FIG. 1.

Turning now to FIG. 3, a schematic diagram of the internal components of laser warning receiver 10 of the presently disclosed embodiment of the invention is shown. In the following Table 1, component values for the electronic components of the circuit of FIG. 3 are listed. It is to be understood, however, that certain of these component values may be different for a given implementation of the present invention, and the values in Table 1 are provided only for the purposes of describing a presently preferred implementation of the invention.

TABLE 1

| Component | Value |
| --- | --- |
| R1 | 10 Ω |
| R2 | 100 Ω |
| R3 | 68 kΩ |
| R4 | 10 Ω |

TABLE 1-continued

| Component | Value |
| --- | --- |
| R6 | 2.2 kΩ |
| R7 | 2.2 kΩ |
| R8 | 1 kΩ |
| R11 | 0 to 5 kΩ |
| R13 | 10 Ω |
| R14 | 10 kΩ |
| R15 | 2.2 kΩ |
| R34 | 1 kΩ |
| R35 | 5.1 kΩ |
| R36 | 10 Ω |
| R37 | 100 kΩ |
| R38 | 1 MΩ |
| R39 | 7.5 kΩ |
| R40 | 100 kΩ |
| R42 | 1 kΩ |
| R43 | 820 Ω |
| R44 | 510 Ω |
| C1 | 10 μF |
| C2 | 0.1 F |
| C3 | 01. F |
| C4 | 0.1 F |
| C6 | 0.01 F |
| C9 | 0.01 F |
| C11 | 10 pF |
| C12 | 0.01 F |
| C13 | 0.1 F |
| C14 | 0.1 F |
| C15 | 0.1 F |
| C16 | 0.1 F |
| C23 | 0.1 F |
| C26 | 10 μF |
| C27 | 0.1 F |
| C28 | 200 pF |
| C29 | 0.01 F |
| C30 | 0.1 F |
| C31 | 0.01 F |
| C32 | 10 pF |
| L1 | 22 μH |
| L3 | 100 μH |
| L3 | 5.6 μH |
| ZD1 | 2.5 V |

As shown in FIG. 3, laser detector 21 comprises three laser detection diodes LD1, LD2, and LD3, which are reversed biased by a ten-volt DC power supply. In the presently disclosed embodiment of the invention, ten-volt DC power may be supplied from a battery or the like. One type of laser detection diode suitable for the purposes of the present invention is the commercially-available BPW34 diode manufactured by Siemens Components, Inc., Optoelectronics Division. The ten-volt power supply is filtered and bypassed by a resistor R1 and capacitors C1 and C2. A pulse of laser energy causes a corresponding pulse of current to flow in laser detection diodes LD1, LD2, and LD3. High-frequency components of the current pulse are effectively bypassed to ground via the path from laser detector 21 through capacitors C3 and C23. This allows the capacitance of reverse-biased laser diodes LD1, LD2, and LD3 to resonate with inductor L1. As a result of this resonance, a decaying sinusoidal voltage waveform is applied to the gate of field-effect transistor (FET) Q1.

A corresponding decaying sinusoidal voltage waveform may be induced at the gate of FET Q1 by applying a voltage pulse to the built-in test (BITE) input circuit. In particular, a voltage pulse may be applied to BITE input terminal 40 shown in FIG. 3. BITE pulse current flowing through capacitor C32 and resistor R44 causes a current to be induced in inductor L1 by inductive and capacitive coupling created by the close physical proximity of circuits 20 and 22. Application of the test voltage pulse to the BITE input terminal 40 enables the functioning of all the components of laser warning receiver 10 (except laser detector 21) to be tested without application of a laser pulse.

Capacitors C26 and C27 in diode current averaging circuit 23 filter the ten-volt power supply before it is applied to a zener diode regulator comprising a voltage dropping resistor R3, zener diode ZD1, and zener noise bypass capacitor C23.

Low-frequency and direct-current components of current produced by laser detector diodes LD1, LD2, and LD3 is not bypassed directly to ground through capacitors C3 and C23. Instead, because of the high impedance of C3 at lower frequencies, low-frequency and direct current passes through a resistor R2, thereby creating a voltage drop proportional to the low-frequency and non-varying illumination to laser detection diodes LD1, LD2, and LD3. The voltage drop across R2 is amplified by the direct-current-coupled automatic gain control (AGC) amplifier 26, to be used as a system automatic gain control voltage. As shown in FIG. 3, AGC amplifier 26 comprises two differential amplifiers U3A and U3B, which may be, for example, commercially-available LMC662 amplifiers manufactured by National Semiconductor. As would be appreciated by one of ordinary skill in the art of circuit design, the combined R2-C3 and R15-R14-C16 time constants determine the dynamic characteristics of the AGC loop. Resistor R13 and capacitor C15 in AGC amplifier 26 filter the power supply voltage applied to amplifiers U3A and U3B.

FET Q1 is used as a source follower to buffer the voltage from resonant tank circuit 22 before it is applied to variable-gain high-frequency amplifier 25. This presents a high load impedance to resonant tank circuit 22 while creating a low impedance point from which to drive variable-gain high-frequency amplifier 25. Resistor R4 and capacitor C4 provide power supply filtering for Q1.

With continued reference to FIG. 3, variable-gain high-frequency amplifier 25 comprises a high-frequency operational amplifier U1, which is biased by a voltage divider comprising resistors R6 and R7. Amplifier U1 may be, for example, a commercially-available CA3028 manufactured by Harris Semiconductor. Inductor L3 provides a direct-current path between the inverting and non-inverting inputs of amplifier U1, while resonating with C14, to force the decaying sinusoidal signal from the output of high-frequency amplifier 24 to appear between the inverting and non-inverting inputs. The differential input voltage is thus amplified by amplifier U1.

Output current from amplifier U1 is forced through the parallel tuned circuit comprising inductor L3, capacitor C28 and resistor R8, to minimize noise and unwanted radio-frequency (RF) components from the output of amplifier U1. Resistor R8 increases the output bandwidth of variable-gain high-frequency amplifier 25 so that the main system alternating current (AC) response is set by resonant tank circuit 22. Gain control from AGC amplifier 26 is applied to variable-gain high-frequency amplifier 25 through resistor R43.

As would be appreciated by one of ordinary skill in the circuit design art, AGC amplifier 26 keeps variable-gain high-frequency amplifier 25 at the lower end of its dynamic range for low-level, low-frequency inputs to laser detection circuit 21. This corresponds to the normal outside quiescent light condition. A laser pulse, characterized by a very fast rise time and usually a very high intensity, does not cause variable-gain high-frequency amplifier 25 to saturate, thereby assuring rapid circuit recovery and maximum instantaneous dynamic range.

The output from variable-gain high-frequency amplifier 25 is coupled to sequential detection logarithmic amplifier 27 by capacitor C6. Resistor R34 is an input bias resistor, and capacitors C9, C12, and C13 are high-frequency bypass capacitors. As shown in FIG. 3, sequential detection logarithmic amplifier U2 which, in the presently disclosed embodiment, may be a commercially-available MC13055 manufactured by Motorola, or the like.

The output voltage from amplifier U2 appears on Log Output line 42. The output voltage on line 42 is directly proportional to the logarithm of the peak amplitude of the decaying sinusoidal output from variable-gain high-frequency amplifier 25. An instantaneous dynamic range of approximately 70-dB above the quiescent noise is available from sequential detection logarithmic video amplifier 27. Variable resistor R11 is used to adjust the slope of the logarithmic transfer curve and capacitor C11 filters out high-frequency components from the output.

The output from sequential detection logarithmic video amplifier 27 is coupled to comparator circuit 28 through capacitor C29. The Log Output signal charges capacitor C31 through diode D1 and resistor R42. Resistor R42 and the output impedance of sequential detection logarithmic video amplifier 27 sets the charging time constant for capacitor C31. When the voltage across capacitor C31 exceeds the Log Output signal minus the forward voltage drop of diode D1 (approximately 0.3-volts for a Schottky barrier diode), the voltage on capacitor C31 decays at a rate set by the RC time constant defined by capacitor C31 and resistor R38. The voltage on capacitor C31 is applied to the inverting input of an amplifier U4, which may be an LM311 manufactured by Texas Instruments, Inc. or the like. The C31 voltage is thus compared with the voltage at the non-inverting input of U4, which voltage corresponds to the Log Output signal reduced by a resistive divider circuit comprising resistors R39 and R40 and voltage offset by the diode voltage drop of a diode D2. Both diodes D1 and D2 are biased slightly positive by current through a resistor R37 after the supply voltage is filtered by a resistor R36 and a capacitor C30. The pulse threshold for comparator 28 is set by resistor R39. A resistor R35 is the output load resistor for amplifier U4.

From the foregoing description of a specific embodiment of the present invention, it should be apparent that a compact, portable laser warning receiver has been disclosed. Although a particular embodiment of the present invention has been described herein in some detail, this has been done for the purposes of illustration only, and is not intended to be limiting with respect to the claims. It is to be understood that various substitutions, alterations, and modifications may be made to the embodiment disclosed herein without departing from the spirit and scope of the present invention, as defined in the claims below.

In particular, while various electronic components have been identified by manufacturer, model number, and/or component value, it is believed by the inventors that various commercially-available substitutes for such components may be equally suitable for the purposes of practicing the present invention.

What is claimed is:

1. A compact laser warning receiver for detecting a laser pulse having a laser pulse width and a laser pulse rise time, said laser warning receiver comprising:

a case, to which said laser pulse and ambient light are applied, said ambient light having a variable level of intensity;

a conductor assembly adapted to receive said laser pulse and said ambient light, said conductor assembly further adapted to conduct said laser pulse and said ambient light from the exterior to the interior of said case;

a photoelectric transducer disposed within said case and responsive to said laser pulse received from said conductor assembly to generate a first electrical signal having an energy content and having a first signal pulse width and a first signal rise time, respectively, corresponding to said laser pulse width and said laser pulse rise time, said first signal pulse width and first signal rise time collectively providing an indication of energy content of said first electrical signal;

said photoelectric transducer further responsive to said ambient light received from said conductor assembly to produce a second electrical signal having a current level corresponding to said variable ambient light;

a resonant circuit, having a resonant frequency, said resonant circuit coupled inductively to said photoelectric transducer and producing an output signal having a voltage level proportional to said energy content of said first signal;

an integrating circuit coupled in series with said photoelectric transducer, said integrating circuit providing a direct current path for said second electrical signal from said photoelectric transducer and further providing a high-voltage short-circuit at said resonant frequency, and producing an integrating circuit output signal having a variable voltage proportional to the integral of said variable ambient light level over a predetermined integration time interval;

a high-frequency amplifier coupled to said resonant circuit and responsive to said resonant circuit output signal to produce an amplified resonant circuit output signal;

a gain control amplifier coupled to said integrating circuit and responsive to said integrating circuit output signal to produce a gain control signal;

a variable gain amplifier, coupled to said high-frequency amplifier and said gain control amplifier and responsive to said gain control signal to amplify said amplified resonant circuit output signal by a gain factor determined by said gain control signal, thereby producing a variable gain amplifier output signal;

a sequential detection logarithmic amplifier, coupled to said variable gain amplifier and responsive to said variable gain amplifier output signal to produce a detection signal corresponding to the logarithm of said variable gain amplifier output signal; and a comparator, coupled to said sequential detection logarithmic amplifier and responsive to said detection signal to provide a warning signal when said detection signal exceeds a predetermined threshold level.

2. A laser warning receiver in accordance with claim 1, wherein said photoelectric transducer comprises at least one silicon photodiode.

3. A laser warning receiver in accordance with claim 1, wherein said photoelectric transducer comprises at least one germanium photodiode.

4. A laser warning receiver in accordance with claim 1, wherein said case has electromagnetic shielding disposed thereon.

5. A laser warning receiver in accordance with claim 1, wherein said conductor assembly comprises a lens array.

6. A laser warning receiver in accordance with claim 1, wherein said conductor assembly comprises a diffuse transmissive plate and a fiberoptic element.

7. A laser warning receiver in accordance with claim 6, wherein said fiberoptic element comprises a flexible fiberoptic bundle.

8. A laser warning receiver in accordance with claim 1, wherein said resonant frequency is selected to minimize electromagnetic interference from man-made sources and to enhance detection of laser pulses having short rise times and pulse widths.

9. A laser warning receiver in accordance with claim 1, further comprising:

a built-in self-test circuit, inductively coupled to said resonant circuit, for inducing said resonant circuit to produce a simulation of said resonating output signal, said laser warning receiver being responsive to said simulation of said resonating output signal to produce a warning signal.

10. A method of generating a laser warning signal in response to a laser pulse having a laser pulse width and a laser pulse rise time, comprising the steps of:

(a) conducting variable levels of ambient light and said laser pulse to a photoelectric transducer;

(b) generating a first electrical signal having energy content and having a first signal pulse width and a first signal rise time, respectively, corresponding to said laser pulse width and said laser pulse rise time;

(c) generating a second electrical signal having a current level corresponding to said variable ambient light level;

(d) producing a resonating signal having a voltage level proportional to said energy content of said first electrical signal;

(e) performing an integration of said second electrical signal to produce an integration output signal having a variable voltage proportional to the integral of said variable ambient light level over a predetermined integration time interval;

(f) amplifying said resonating signal to produce an amplified resonating signal;

(g) amplifying said integration output signal to produce a variable gain control signal;

(h) amplifying said amplified resonating signal at a gain determined by said variable gain control signal to produce a variable gain amplifier output signal;

(i) applying said variable gain amplifier output signal to a sequential detection logarithmic amplifier to produce a detection signal;

(j) comparing said detection signal to a predetermined reference voltage; and (k) producing a warning signal when said detection signal exceeds said reference voltage.

11. A method in accordance with claim 10, further comprising the steps of:

(l) producing a simulation of said resonating signal; and (m) performing steps (e) through (k) on said simulation of said resonating signal.

12. A compact laser warning receiver responsive to a laser pulse in the presence of variable levels of ambient light to produce a warning signal, said laser warning receiver comprising:
- a photoelectric transducer, electrically coupled in series with a resonant tank circuit, said transducer adapted to receive said ambient light and said laser pulse, said transducer also being electrically coupled to a current averaging circuit;
- a gain control circuit, electrically coupled to said current averaging circuit and adapted to produce a gain control signal corresponding to said variable levels of ambient light;
- a variable gain amplifier, coupled to said gain control circuit to receive said gain control signal, and further coupled to a high-frequency amplifier to receive an amplified damped sinusoidal signal therefrom;
- said high-frequency amplifier being electrically coupled to said resonant tank circuit and adapted to receive a damped sinusoidal signal therefrom, said resonant tank circuit and said photoelectric transducer being adapted to cooperatively produce said damped sinusoidal signal in response to said laser pulse;
- a logarithmic amplifier, having an input electrically coupled to said variable gain amplifier to receive a variable-gain amplified damped sinusoidal signal therefrom, and having an output electrically coupled to a comparator with hysteresis; and
- said comparator adapted to produce said warning signal when said logarithmic amplifier output exceeds a predetermined threshold.

13. A compact laser warning receiver in accordance with claim 12, further comprising:
- a built-in test circuit, inductively coupled to said resonant tank circuit and operative to cause said resonant tank circuit to produce a simulation of said damped sinusoidal signal; and
- said laser warning receiver being responsive to said simulation of said damped sinusoidal signal to produce said warning signal.

14. A compact laser warning receiver in accordance with claim 12, wherein said photoelectric transducer comprises at least one silicon photodiode.

15. A compact laser warning receiver in accordance with claim 12, wherein said photoelectric transducer comprises at least one germanium photodiode.

16. A compact laser warning receiver for detecting a laser pulse in the presence of ambient background light, said laser pulse having a pulse width and a rise time, said laser warning receiver comprising:
- a photoelectric transducer responsive to the laser pulse;
- a resonant circuit coupled to said photoelectric transducer to produce an output signal having a voltage level proportional to the energy content of said laser pulse; and
- a logarithmic video amplifier coupled to said resonant circuit and responsive to said output signal to produce a detection signal whose amplitude is proportional to the logarithm of the power in the laser pulse.

17. The laser warning receiver of claim 16, further comprising a comparator coupled to said logarithmic video amplifier to provide a warning signal when said detection signal exceeds a predetermined threshold level.

18. A compact laser warning receiver for detecting a laser pulse in the presence of ambient light comprising:
- a photoelectric transducer responsive to a laser pulse to generate a first electrical signal;
- said photoelectric transducer further responsive to ambient light intensity to produce a second electrical signal;
- a resonant circuit coupled to said photoelectric transducer to produce a resonating output signal having a voltage level proportional to an energy content of said first signal;
- an integrating circuit coupled to said photoelectric transducer producing an integrating circuit output signal having a voltage proportional to the integral of said second electrical signal;
- a high-frequency amplifier coupled to said resonant circuit and responsive to said resonant circuit output signal to produce an amplified resonant circuit output signal;
- a gain control amplifier coupled to said integrating circuit and responsive to said integrating circuit output signal to produce a gain control signal;
- a variable gain amplifier, coupled to said high-frequency amplifier and said gain control amplifier and responsive to said gain control signal to amplify said amplified resonant circuit output signal by a gain factor determined by said gain control signal, thereby producing a variable gain amplifier output signal;
- a logarithmic amplifier coupled to said variable gain amplifier and responsive to said variable gain amplifier output signal to produce a detection signal corresponding to the logarithm of said variable gain amplifier output signal.

19. A laser warning receiver in accordance with claim 18, wherein said photoelectric transducer comprises at least one photodiode.

20. A laser warning receiver in accordance with claim 18, further comprising a case to which said laser pulse and ambient light are applied, said case comprising electromagnetic shielding.

21. A laser warning receiver in accordance with claim 18, further comprising a conductor assembly to receive said laser pulse and said ambient light and to transmit said laser pulse and said ambient light to said photoelectric transducer.

22. A laser warning receiver in accordance with claim 18, further comprising:
- a built-in self-test circuit, inductively coupled to said resonant circuit, for inducing said resonant circuit to produce a simulated resonating output signal.

23. A method of generating a laser warning signal in response to a laser pulse in the presence of ambient light, wherein said laser pulse has a pulse width and a rise time, said method comprising the steps of:
- detecting said laser pulse;
- producing a resonating signal having a voltage level proportional to the energy content of said laser pulse; and
- applying said resonating signal to a logarithmic amplifier to produce a detection signal.

24. The method of claim 23, further comprising:
- comparing said detection signal to a predetermined reference voltage; and
- producing a warning signal when said detection signal exceeds said reference voltage.

* * * * *